United States Patent
Sachdev et al.

(10) Patent No.: US 11,082,241 B2
(45) Date of Patent: Aug. 3, 2021

(54) PHYSICALLY UNCLONABLE FUNCTION WITH FEED-FORWARD ADDRESSING AND VARIABLE LATENCY OUTPUT

(71) Applicant: Intel Corporation, Santa Clara, CA (US)

(72) Inventors: Manoj Sachdev, Waterloo (CA); Vikram Suresh, Portland, OR (US); Sanu Mathew, Portland, OR (US); Sudhir Satpathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 15/941,050

(22) Filed: Mar. 30, 2018

(65) Prior Publication Data

US 2019/0044739 A1    Feb. 7, 2019

(51) Int. Cl.
| | |
|---|---|
| H04L 9/32 | (2006.01) |
| H04L 9/08 | (2006.01) |
| G06F 9/30 | (2018.01) |
| G06F 21/44 | (2013.01) |
| G09C 1/00 | (2006.01) |
| H03M 7/30 | (2006.01) |

(52) U.S. Cl.
CPC ........ *H04L 9/3278* (2013.01); *G06F 9/30134* (2013.01); *G06F 21/44* (2013.01); *G09C 1/00* (2013.01); *H04L 9/0866* (2013.01); *H03M 7/30* (2013.01); *H04L 2209/12* (2013.01)

(58) Field of Classification Search
CPC . H04L 9/3278; H04L 9/0866; H04L 2209/12; G06F 9/30134; G06F 21/44; G06F 21/73; G09C 1/00; H03M 7/30

USPC .......................................................... 713/189
See application file for complete search history.

(56) References Cited

U.S. PATENT DOCUMENTS

| | | | | |
|---|---|---|---|---|
| 5,210,864 A | * | 5/1993 | Yoshida .................... | G06F 9/30 712/E9.016 |
| 5,301,199 A | * | 4/1994 | Ikenaga ............. | G01R 31/3185 714/732 |
| 5,617,531 A | * | 4/1997 | Crouch ................ | G11C 29/006 714/10 |
| 5,668,810 A | * | 9/1997 | Cannella, Jr. ........... | H04L 12/56 348/E7.056 |
| 5,774,477 A | * | 6/1998 | Ke ................. | G01R 31/318385 714/727 |

(Continued)

OTHER PUBLICATIONS

Ruhrmair et al., "PUF modeling attacks on simulated and silicon data", IEEE Tran. on Information Forensics and Security, Nov. 2013, 17 pages.

*Primary Examiner* — Shahriar Zarrineh
(74) *Attorney, Agent, or Firm* — Jordan IP Law, LLC

(57) ABSTRACT

An embodiment of a semiconductor package apparatus may include technology to generate a first output from a physically unclonable function (PUF) based on a challenge, modify the challenge based on the first output, and generate a response based on the modified challenge. Some embodiments may additionally or alternatively include technology to change a read sequence of the PUF based on an output of the PUF. Some embodiments may additionally or alternatively include technology to vary a latency of a linear feedback shift register based on an output from the PUF. Other embodiments are disclosed and claimed.

6 Claims, 10 Drawing Sheets

(56) References Cited

U.S. PATENT DOCUMENTS

| | | | | |
|---|---|---|---|---|
| 7,409,608 B1* | 8/2008 | Ferrucci | G06F 13/4243 | |
| | | | | 714/724 |
| 7,877,604 B2* | 1/2011 | Van Dijk | G06F 21/52 | |
| | | | | 713/168 |
| 8,516,269 B1* | 8/2013 | Hamlet | G06F 21/445 | |
| | | | | 340/5.8 |
| 8,525,169 B1* | 9/2013 | Edelstein | H01L 23/544 | |
| | | | | 257/48 |
| 8,667,265 B1* | 3/2014 | Hamlet | H04L 9/0866 | |
| | | | | 326/80 |
| 8,694,856 B2* | 4/2014 | Tuyls | H04L 9/002 | |
| | | | | 714/763 |
| 9,264,048 B2* | 2/2016 | Parker | H03K 19/17768 | |
| 9,444,618 B1* | 9/2016 | Trimberger | H04L 9/3278 | |
| 10,027,472 B2* | 7/2018 | Suresh | H03K 19/003 | |
| 10,079,678 B2* | 9/2018 | Smith | G06F 21/6209 | |
| 10,103,895 B1* | 10/2018 | Tseng | G11C 13/004 | |
| 10,177,922 B1* | 1/2019 | Hamlet | G06F 21/57 | |
| 2003/0025191 A1* | 2/2003 | Takeoka | H01L 23/12 | |
| | | | | 257/700 |
| 2003/0229838 A1* | 12/2003 | Hiraide | G01R 31/318547 | |
| | | | | 714/738 |
| 2003/0229886 A1* | 12/2003 | Hasegawa | G01R 31/318563 | |
| | | | | 717/115 |
| 2005/0034041 A1* | 2/2005 | Casarsa | G01R 31/3004 | |
| | | | | 714/733 |
| 2005/0077905 A1* | 4/2005 | Sasaki | G01R 1/045 | |
| | | | | 324/500 |
| 2006/0271792 A1* | 11/2006 | Devadas | G06F 21/31 | |
| | | | | 713/189 |
| 2007/0016826 A1* | 1/2007 | Dubey | G11C 29/003 | |
| | | | | 714/30 |
| 2009/0083833 A1* | 3/2009 | Ziola | G06F 21/31 | |
| | | | | 726/2 |
| 2010/0127822 A1* | 5/2010 | Devadas | H04L 9/3278 | |
| | | | | 340/5.8 |
| 2010/0165719 A1* | 7/2010 | Pellizzer | G11C 11/56 | |
| | | | | 365/163 |
| 2010/0174955 A1* | 7/2010 | Carnevale | G11C 5/04 | |
| | | | | 714/718 |
| 2011/0299678 A1* | 12/2011 | Deas | H04L 9/003 | |
| | | | | 380/28 |
| 2012/0311320 A1* | 12/2012 | Brown | H04L 9/3226 | |
| | | | | 713/155 |
| 2013/0142329 A1* | 6/2013 | Bell | H04L 9/0877 | |
| | | | | 380/44 |
| 2013/0147511 A1* | 6/2013 | Koeberl | H04L 9/3263 | |
| | | | | 326/8 |
| 2014/0041040 A1* | 2/2014 | Potkonjak | G06F 21/64 | |
| | | | | 726/26 |
| 2014/0047565 A1* | 2/2014 | Baek | H04L 9/3278 | |
| | | | | 726/30 |
| 2014/0108786 A1* | 4/2014 | Kreft | G06Q 20/3825 | |
| | | | | 713/156 |
| 2014/0140502 A1* | 5/2014 | Brightsky | H04L 9/08 | |
| | | | | 380/28 |
| 2014/0189890 A1* | 7/2014 | Koeberl | H04L 9/0866 | |
| | | | | 726/34 |
| 2015/0101037 A1* | 4/2015 | Yang | H04L 9/3278 | |
| | | | | 726/16 |
| 2016/0087805 A1* | 3/2016 | Li | H04L 9/0866 | |
| | | | | 713/193 |
| 2016/0149712 A1* | 5/2016 | Guo | H04L 63/0884 | |
| | | | | 713/168 |
| 2016/0301534 A1* | 10/2016 | Chen | H04L 9/3278 | |
| 2016/0364582 A1* | 12/2016 | Cammarota | G06F 21/72 | |
| 2017/0038807 A1* | 2/2017 | Bittlestone | G06F 1/26 | |
| 2017/0048072 A1* | 2/2017 | Cambou | G09C 1/00 | |
| 2017/0077046 A1* | 3/2017 | Gupta | H01L 29/408 | |
| 2017/0126414 A1* | 5/2017 | Goel | G06F 3/0622 | |
| 2017/0149572 A1* | 5/2017 | Wallrabenstein | G06F 21/34 | |
| 2017/0329954 A1* | 11/2017 | Lao | G06F 21/44 | |
| 2017/0364709 A1* | 12/2017 | Plusquellic | G06F 21/604 | |
| 2018/0131527 A1* | 5/2018 | Lu | G09C 1/00 | |
| 2018/0183613 A1* | 6/2018 | Dafali | H04L 9/3278 | |
| 2019/0026457 A1* | 1/2019 | Plusquellic | G06F 21/70 | |
| 2019/0028284 A1* | 1/2019 | Rezayee | H04L 9/3278 | |
| 2019/0065734 A1* | 2/2019 | Yao | G06F 21/31 | |
| 2019/0190725 A1* | 6/2019 | De | H04L 9/3278 | |
| 2019/0238519 A1* | 8/2019 | Bikumala | H04L 9/3278 | |
| 2019/0384915 A1* | 12/2019 | Hars | H04L 9/3236 | |
| 2019/0385489 A1* | 12/2019 | Norrman | G09C 1/00 |

* cited by examiner

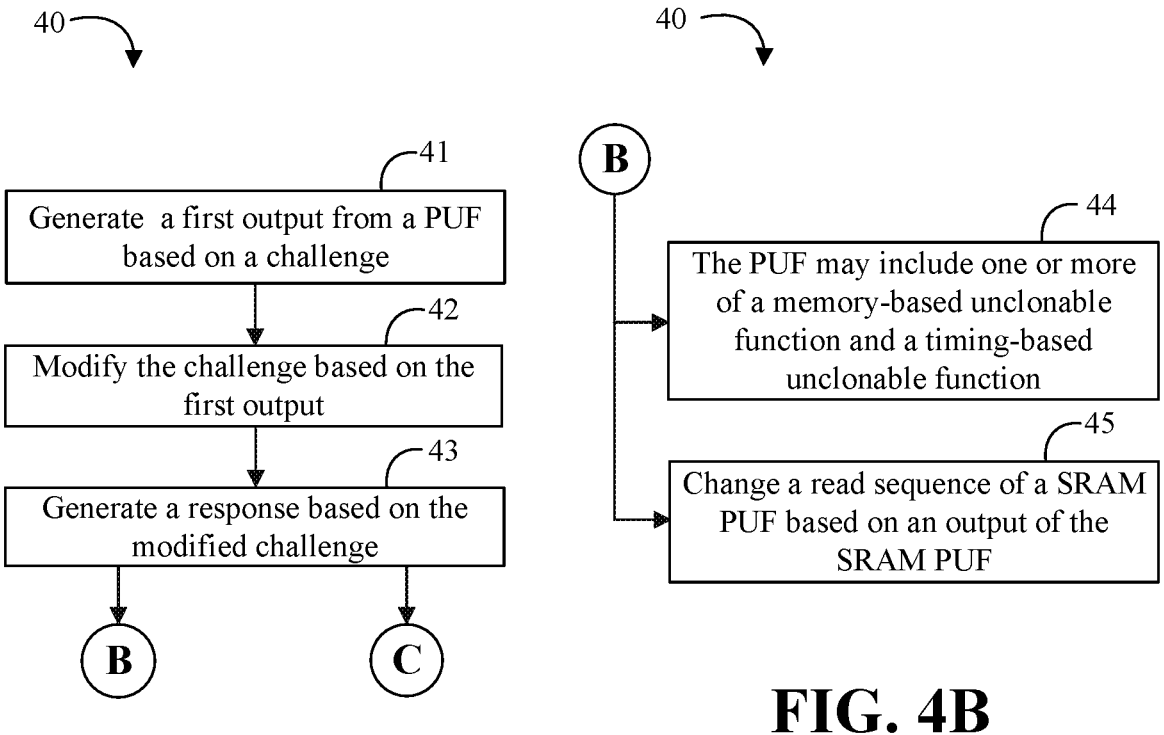
FIG. 4A
FIG. 4B
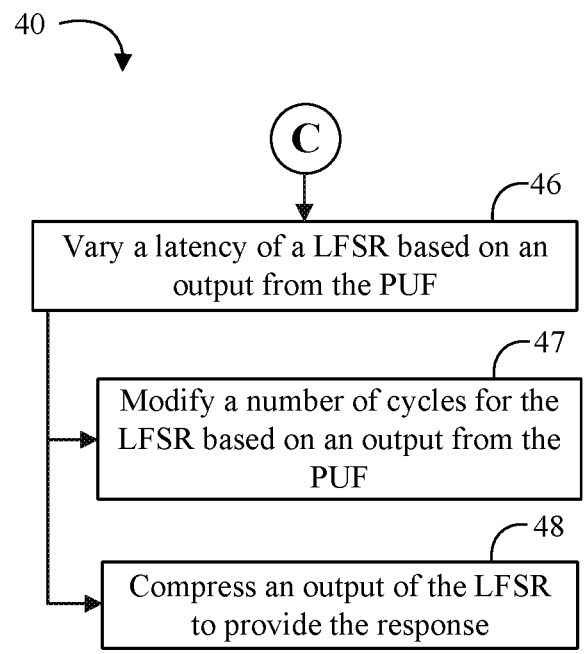
FIG. 4C

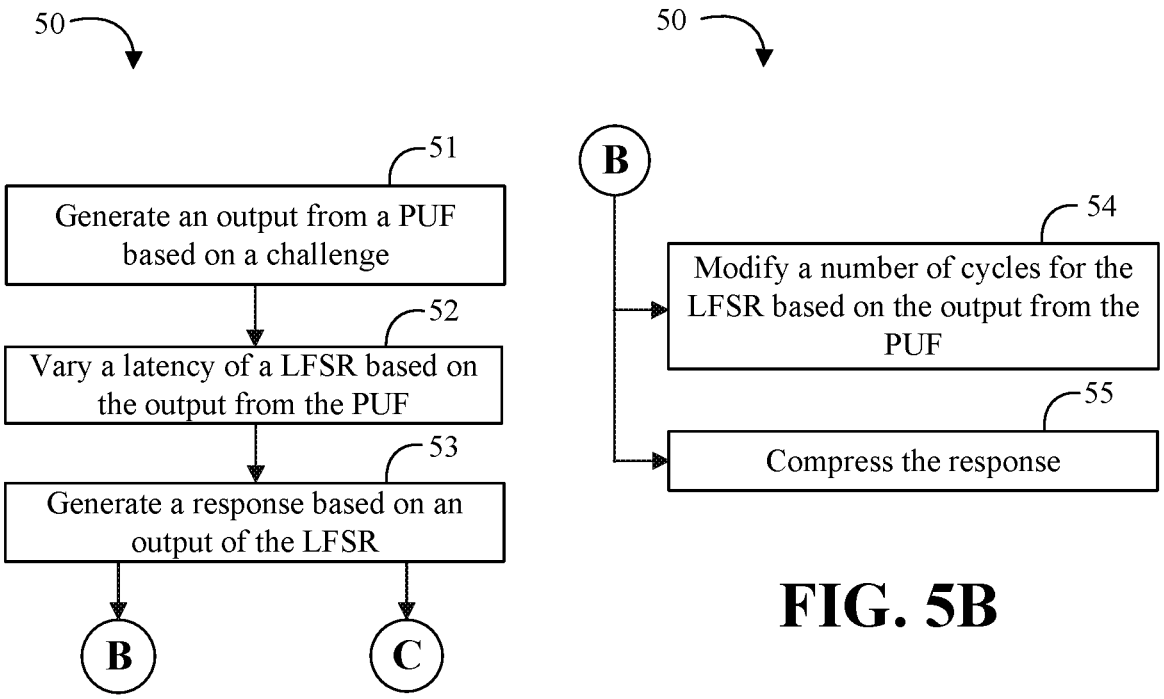
FIG. 5A
FIG. 5B
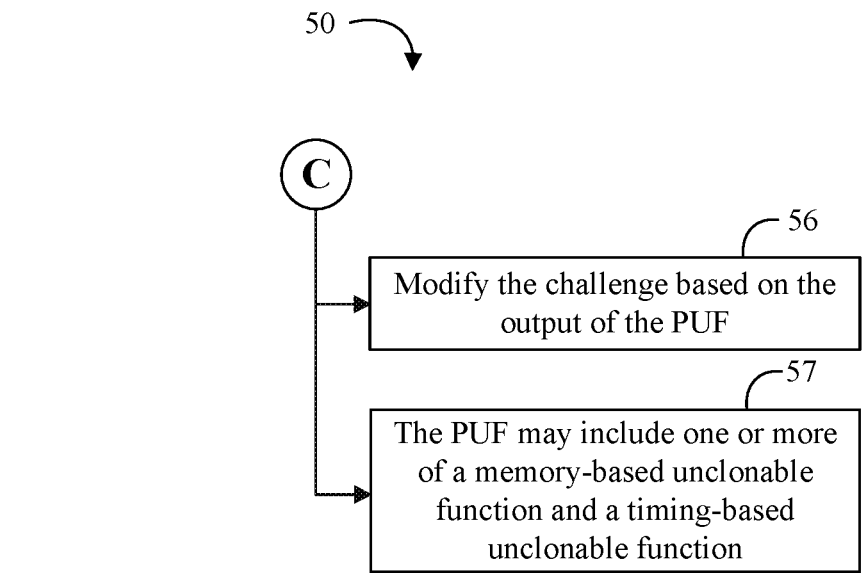
FIG. 5C

PHYSICALLY UNCLONABLE FUNCTION WITH FEED-FORWARD ADDRESSING AND VARIABLE LATENCY OUTPUT

TECHNICAL FIELD

Embodiments generally relate to authentication security systems. More particularly, embodiments relate to a physically unclonable function with feed-forward addressing and variable latency output.

BACKGROUND

A physically unclonable function (PUF) may provide a unique identity for a device based on unique physical variations in the device (e.g., sometimes also referred to as physical unclonable function). For example, such variations may occur naturally during semiconductor manufacturing and the PUF may allow differentiation between otherwise identical semiconductor devices. In cryptography, a PUF may refer to a physical structure that may be embedded in a physical device such as an integrated circuit (IC).

BRIEF DESCRIPTION OF THE DRAWINGS

The various advantages of the embodiments will become apparent to one skilled in the art by reading the following specification and appended claims, and by referencing the following drawings, in which:

FIGS. 4A to 4C are flowcharts of an example of a method of generating a response to a challenge according to an embodiment;

FIGS. 5A to 5C are flowcharts of another example of a method of generating a response to a challenge according to an embodiment;

DESCRIPTION OF EMBODIMENTS

Figure 1:
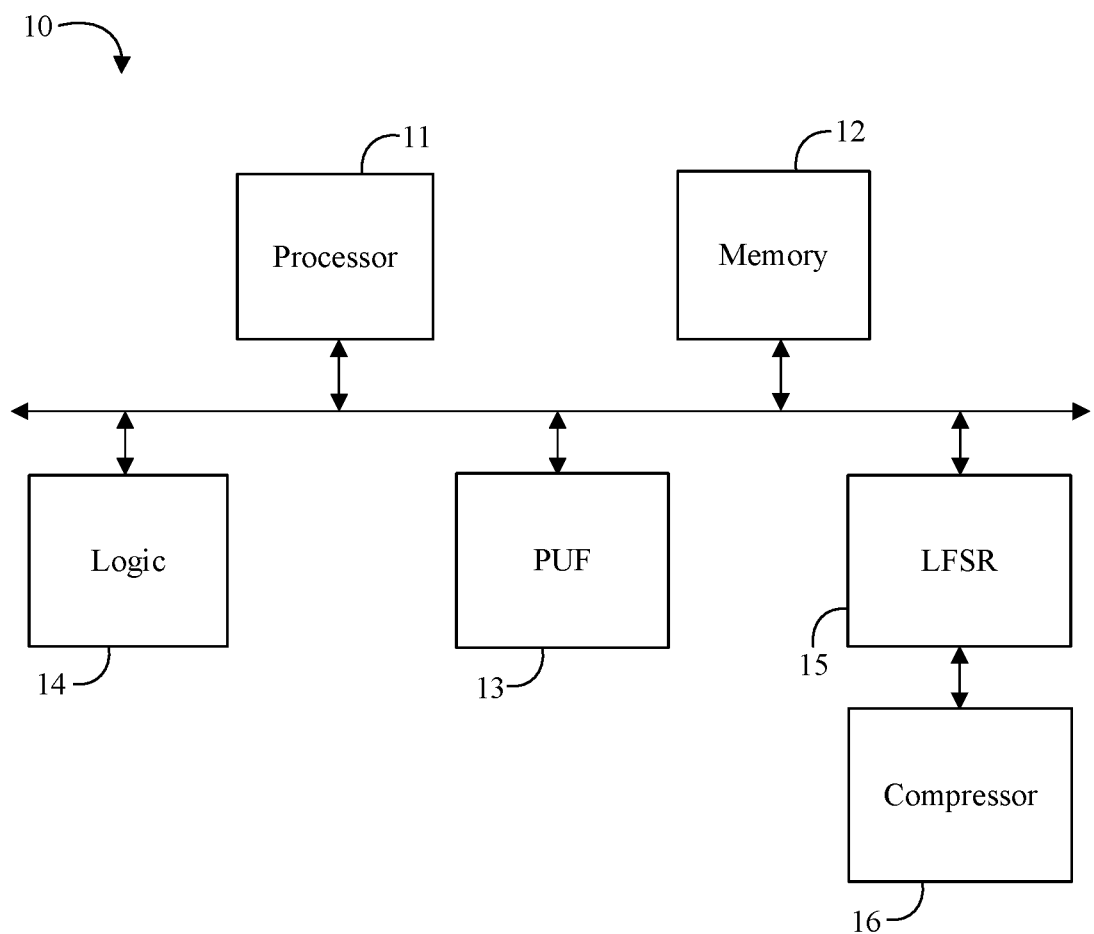
FIG. 1 is a block diagram of an example of an electronic processing system according to an embodiment.

Turning now to FIG. 1, an embodiment of an electronic processing system 10 may include a processor 11, memory 12 communicatively coupled to the processor 11, a physically unclonable function (PUF) 13, and logic 14 communicatively coupled to the processor 11 and the PUF 13. The PUF 13 and suitable logic 14 may provide a security primitive which may be beneficial to authenticate the system 10. Advantageously, the logic 14 may include technology to decorrelate a challenge sent to the system 10 from an actual challenge provided to the PUF 13 (e.g., at the front end), and/or to decorrelate a response returned to the challenger from an actual response generated by the PUF 13 (e.g., at the back end). The front-end decorrelation may be independent from the back-end decorrelation. In some embodiments, the system 10 may include only the front-end decorrelation, only the back-end decorrelation, or the system 10 may include both the front-end decorrelation and the back-end decorrelation.

In some embodiments, the logic 14 may be configured to generate a first output from the PUF 13 based on a challenge, modify the challenge based on the first output (e.g., a front-end decorrelation), and generate a response based on the modified challenge. For example, the PUF 13 may include a static random access memory (SRAM) and the logic 14 may be additionally or alternatively configured to change a read sequence of the SRAM based on an output of the PUF.

In some embodiments, the system 10 may additionally or alternatively include a variable latency linear feedback shift register (LFSR) 15 communicatively coupled to the logic 14 (e.g., a back-end decorrelation). For example, the logic 14 may be further configured to modify a number of cycles for the variable latency LFSR 15 based on an output from the PUF 13. The system 10 may optionally include a compressor 16 communicatively coupled to the variable latency LFSR 15 to compress the response. For example, the PUF 13 may include one or more of a memory-based unclonable function (e.g., a SRAM PUF) and a timing-based unclonable function (e.g., an arbiter PUF, a ring oscillator PUF, etc.). In some embodiments, the PUF 13, the logic 14, the LFSR 15, and/or the compressor 16 may be located in, or co-located with, various components, including the processor 11 (e.g., on a same die).

Embodiments of each of the above processor 11, memory 12, PUF 13, logic 14, LFSR 15, compressor 16, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 14, generating output from the PUF based on a challenge, modifying the challenge based on the PUF output, generating a response based on the modified challenge, varying a latency of the LFSR, etc.).

Figure 2:
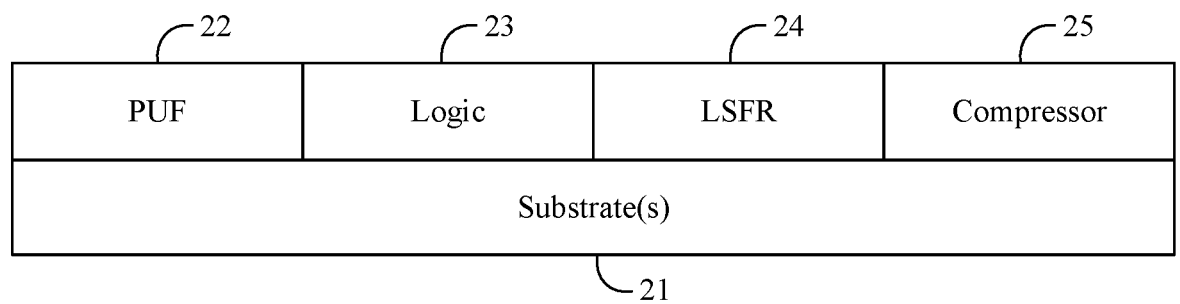
FIG. 2 is a block diagram of an example of a semiconductor package apparatus according to an embodiment.

Turning now to FIG. 2, an embodiment of a semiconductor package apparatus 20 may include one or more substrates 21, a PUF 22 coupled to the one or more substrates, and logic 23 coupled to the PUF 22 and the one or more substrates 21, wherein the logic 23 may be at least partly implemented in one or more of configurable logic and fixed-functionality hardware logic. The PUF 22 and suitable logic 23 may provide a security primitive which may be beneficial to authenticate the apparatus 20. The logic 23 may be configured to generate a first output from the PUF 22 based on a challenge, modify the challenge based on the first output, and generate a response based on the modified challenge. For example, the PUF 22 may include a SRAM and the logic 23 may be additionally or alternatively configured to change a read sequence of the SRAM based on an output of the PUF. The apparatus 20 may additionally include a variable latency LFSR 24 communicatively coupled to the logic 23. For example, the logic 23 may be configured to modify a number of cycles for the variable latency LFSR 24 based on an output from the PUF 22. The apparatus 20 may optionally also include a compressor 25 communicatively coupled to the variable latency LFSR 24 to compress the response. For example, the PUF 22 may include one or more of a memory-based unclonable function and a timing-based unclonable function. In some embodiments, the logic 23 coupled to the one or more substrates 21 may include transistor channel regions that are positioned within the one or more substrates 21.

Figure 3:
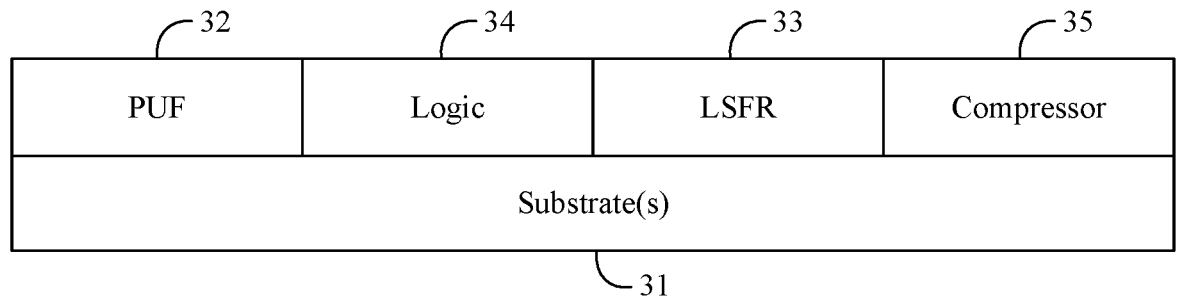
FIG. 3 is a block diagram of another example of a semiconductor package apparatus according to an embodiment.

Turning now to FIG. 3, an embodiment of a semiconductor package apparatus 30 may include one or more substrates 31, a PUF 32 coupled to the one or more substrates 31, a LFSR 33 communicatively coupled to the one or more substrates 31, and logic 34 coupled to the PUF 32, the LFSR 33, and to the one or more substrates 31. For example, logic 34 may be at least partly implemented in one or more of configurable logic and fixed-functionality hardware logic. The PUF 32 and suitable logic 34 may provide a security primitive which may be beneficial to authenticate the apparatus 30. The logic 34 coupled to the one or more substrates 31 may be configured to generate an output from the PUF 32 based on a challenge, vary a latency of the LFSR 33 based on the output from the PUF 32, and generate a response based on an output of the LFSR 33. For example, the logic 34 may be further configured to modify a number of cycles for the LFSR 33 based on the output from the PUF 32. The apparatus 30 may optionally include a compressor 35 communicatively coupled to the LFSR 33 to compress the response. In some embodiments, the logic 34 may be additionally configured to modify the challenge based on the output of the PUF 32. For example, the PUF 32 may include one or more of a memory-based unclonable function and a timing-based unclonable function. In some embodiments, the logic 34 coupled to the one or more substrates 31 may include transistor channel regions that are positioned within the one or more substrates.

Embodiments of the PUF 22, the logic 23, the LFSR 24, the compressor 25, and other components of the apparatus 20, the PUF 32, the LFSR 33, the logic 34, the compressor 35, and other components of the apparatus 30, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Turning now to FIGS. 4A to 4C, an embodiment of a method 40 of generating a response to a challenge may include generating a first output from a PUF based on a challenge at block 41, modifying the challenge based on the first output at block 42, and generating a response based on the modified challenge at block 43. For example, the PUF may include one or more of a memory-based unclonable function and a timing-based unclonable function at block 44. In some embodiments, the PUF may include a SRAM and the method 40 may additionally or alternatively include changing a read sequence of the SRAM based on an output of the PUF at block 45. In some embodiments, the method 40 may further include varying a latency of a LFSR based on an output from the PUF at block 46. For example, the method 40 may include modifying a number of cycles for the LFSR based on an output from the PUF at block 47, and/or compressing an output of the LFSR to provide the response at block 48.

Turning now to FIGS. 5A to 5C, an embodiment of a method 50 of generating a response to a challenge may include generating an output from a PUF based on a challenge at block 51, varying a latency of a LFSR based on the output from the PUF at block 52, and generating a response based on an output of the LFSR at block 53. For example, the method 50 may further include modifying a number of cycles for the LFSR based on the output from the PUF at block 54, and/or compressing the response at block 55. Some embodiments of the method 50 may additionally include modifying the challenge based on the output of the PUF at block 56. For example, the PUF may include one or more of a memory-based unclonable function and a timing-based unclonable function at block 57.

Embodiments of the methods 40, 50 may be implemented in a system, apparatus, computer, device, etc., for example, such as those described herein. More particularly, hardware implementations of the methods 40, 50 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the methods 40, 50 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the methods 40, 50 may be implemented on a computer readable medium as described in connection with Examples 31 to 35 and/or Examples 41 to 46 below. Embodiments or portions of the methods 40, 50 may be implemented in firmware, applications (e.g., through an application programming interface (API)), or driver software running on an operating system (OS).

The apparatus 20 (FIG. 2) and/or the apparatus 30 (FIG. 3) may implement one or more aspects of the method 40 (FIGS. 4A to 4C), the method 50 (FIGS. 5A to 5C), or any of the embodiments discussed herein. In some embodiments, the illustrated apparatuses 20, 30 may include one or more substrates (e.g., silicon, sapphire, gallium arsenide) and logic (e.g., transistor array and other integrated circuit/IC components) coupled to the substrate(s). The logic (e.g., logic 23, logic 34) may be implemented at least partly in configurable logic or fixed-functionality logic hardware. In one example, the logic may include transistor channel regions that are positioned (e.g., embedded) within the substrate(s). Thus, the interface between the logic and the substrate(s) in FIGS. 2 and 3 may not be an abrupt junction. The logic may also be considered to include an epitaxial layer that is grown on an initial wafer of the substrate(s).

Figure 6A:
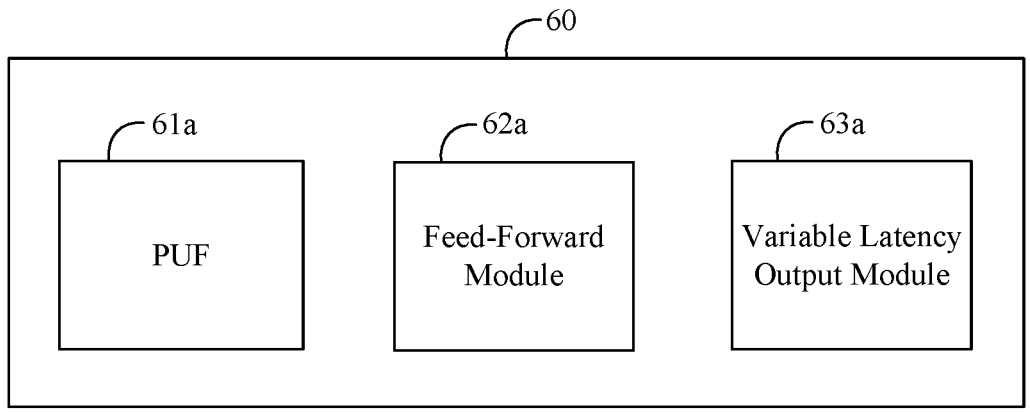
FIGS. 6A to 6C are block diagrams of examples of strong PUF apparatuses according to embodiments.
Figure 6B:
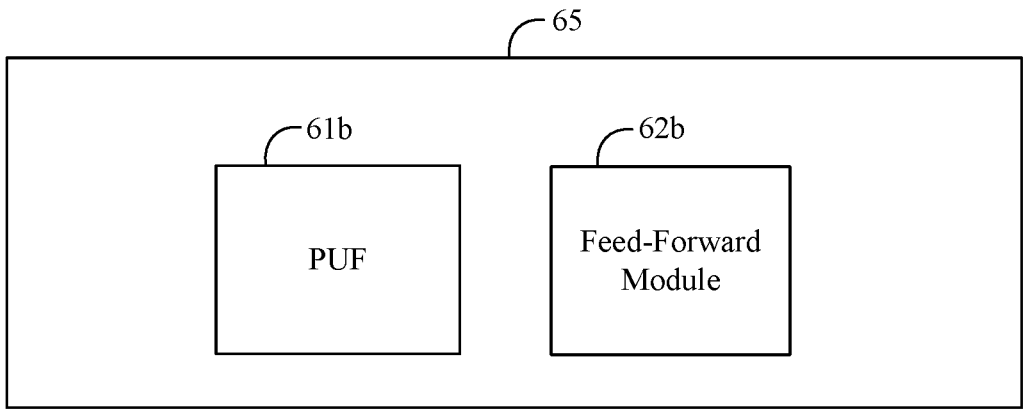
Figure 6C:
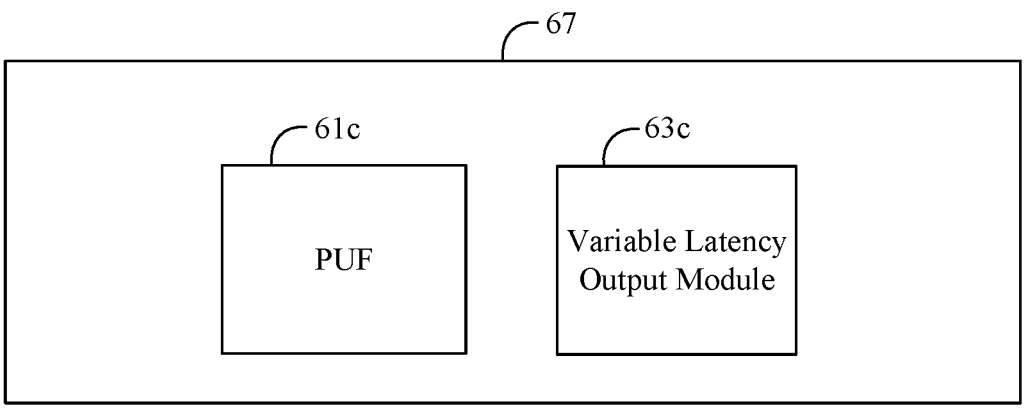

Turning now to FIGS. 6A to 6C, some embodiments may be physically or logically arranged as one or more modules. For example, an embodiment of a strong PUF apparatus 60 may include a PUF 61a, a feed-forward module 62a, and a variable latency output module 63a (e.g., see FIG. 6A). Another embodiment of a strong PUF apparatus 65 may include a PUF 61b and a feed-forward module 62b (e.g., see FIG. 6B). Another embodiment of a strong PUF apparatus 67 may include a PUF 61c and a variable latency output module 63c (e.g., see FIG. 6C). Any suitable technology may be utilized for the PUFs 61a-c (e.g., SRAM PUF, arbiter PUF, ring oscillator PUF, etc.). The feed-forward modules 62a-b may provide a front-end decorrelation between a submitted challenge and an actual challenge provided to the PUFs 61a-b. The variable latency output modules 63a, 63c may provide a back-end decorrelation between a response returned to the challenger and an actual response generated by the PUFs 61a, 61c. Advantageously, the feed-forward module 62b and the variable latency output module 63c may independently improve the resistance of the apparatuses 65 and 67 to attacks on the corresponding PUFs 61b, 61c, and may provide even more resistance to such attacks on the PUF 61a when utilized together in the apparatus 60.

Embodiments of the PUFs 61a-c, the feed-forward modules 62a-b, the variable latency output modules 63a, 63c, and other components of the strong PUF apparatuses 60, 65, and 67 may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide a machine learning (ML) attack resistant SRAM strong PUF using feed-forward addressing and/or a variable latency output LFSR. Strong PUF may be beneficial for various authentication purposes. However, some PUF architectures such as the arbiter PUF or XOR arbiter PUF may be successfully attacked and their response may be anticipated using various ML algorithms. Some embodiments may advantageously provide a more ML attack-resistant PUF which may be suitable for secure authentication applications.

In some embodiments of a strong PUF device, an SRAM array may provide the source of entropy for the PUF (e.g., a strong SRAM PUF device). In some embodiments, a challenge-response operation may be performed in a 2-step process. First, the challenge may be used to generate an initial response from the SRAM array. Second, the initial response may be used to either modify the input challenge or change the read sequence of the array based on the input challenge. Advantageously, some embodiments of a feed-forward technique may limit the visibility for an attacker to accurately model the SRAM locations read or the sequence of read operation, thereby providing resistance to ML modelling attacks.

In some embodiments, a multibit output from the SRAM array, using the modified challenge, may be compressed to a one or more bit response through a variable latency linear feedback shift register (LFSR). In some embodiments, an output compressor may provide further resistance against ML based attacks. By obfuscating the starting seed as well as the number of cycles an LFSR runs, some embodiments may make it more challenging to determine the conditions that generate a specific output. Advantageously, some embodiments may provide a hash like one-way operation improving ML resistance with significantly less cost. The output of the LFSR may also be compressed using a compressor to further obfuscate the output response.

For a memory-based PUF device, the PUF operation may be implemented in a 2-pass process to provide feed-forward addressing. The feed-forward addressing may reduce the visibility for an attacker to model the SRAM locations accessed and the read sequence for any given challenge. Further, an output LFSR with variable latency counter may be utilized to increase the PUF's resistance against ML attacks. For example, the multi-bit output (e.g., k bits) of the SRAM may be divided into two segments. The first segment (e.g., p bits) may be loaded into an LFSR. The second segment (e.g., $q=k-p$ bits) may be loaded into a down counter which may determine how many times the LFSR will be clocked. The output bit-stream of the LFSR may be compressed using an output compressor (e.g., successive XOR) to produce a response of fewer than 'p' bits. Advantageously, in some embodiments, these measures together may provide significant resistance against ML and other attacks.

Some other technology for combining multiple response bits from PUFs to increase ML attack resistance may include XOR-ing or the use of crypto/hash functions. Although an XOR function may increases the non-linearity of the output, it does not exploit the order of response bits to increase ML attack resistance. Using a hash function or ciphers may have significant silicon area and/or power overhead. Advantageously, some embodiments may provide address feed-forwarding with little or no additional hardware or impact on the cost, silicon area, and/or power overhead. For example, in some embodiments the variable latency LFSR may introduce an order based non-linearity to the final output response at a lower implementation cost as compared to hash functions. An XOR function can then be used to compress the LFSR output, while still maintaining the order-based non-linearity introduced by the LFSR. In some other SRAM PUF devices, challenges may be sent to the address decoder which leads to significantly large array sizes. For example, for a 64 bit challenge, $2^{64}$ SRAM cells may be required (e.g., over 18 quintillion). Advantageously, some embodiments may substantially reduce the number of SRAM cells needed. For example, some embodiments may utilize only 2*k SRAM cells for a k bit challenge.

Figure 7:
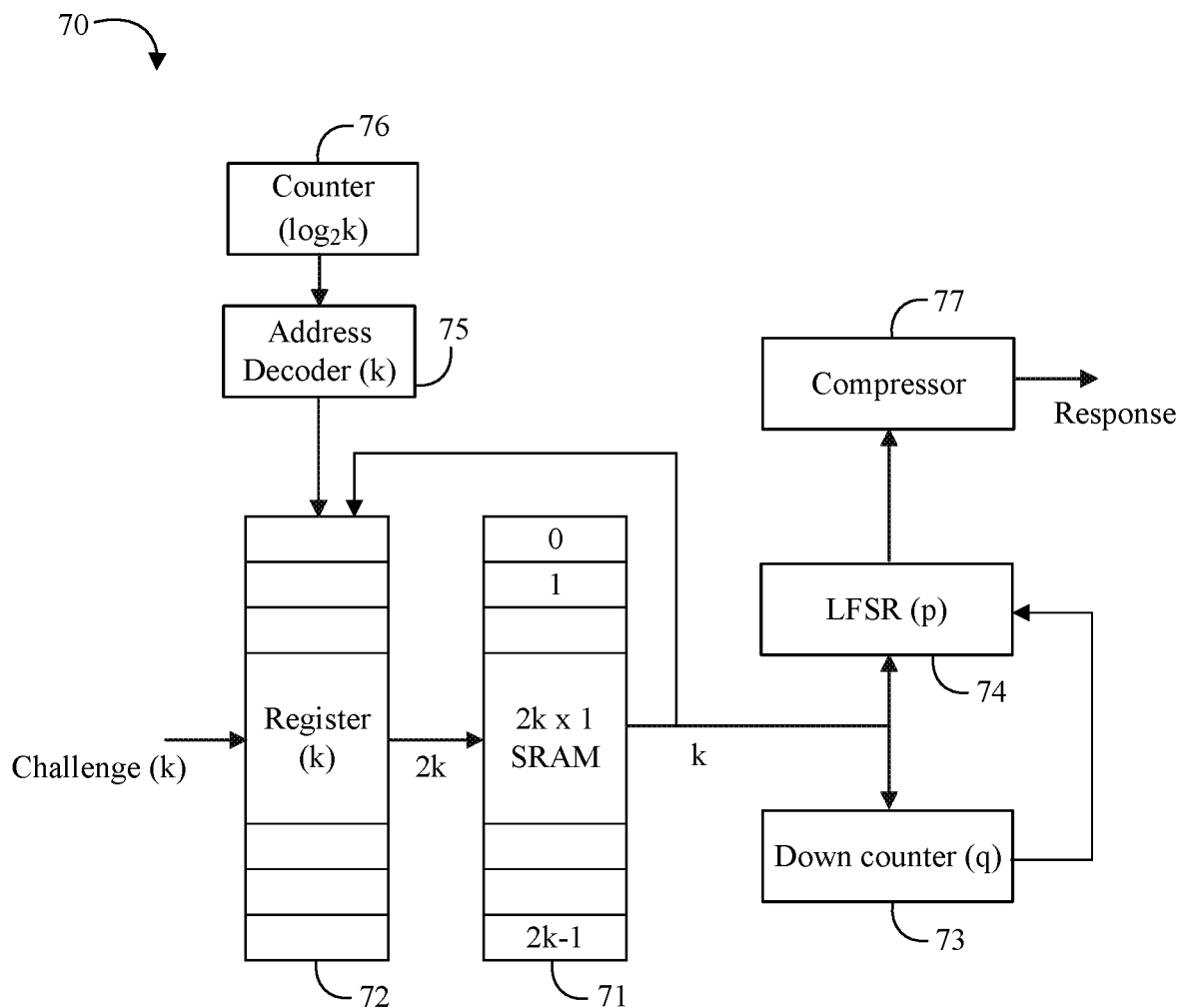
FIG. 7 is a block diagram of an example of a strong SRAM PUF apparatus according to an embodiment.

Turning now to FIG. 7, a strong SRAM PUF apparatus 70 may include a SRAM 71 as a source of entropy. For example, the SRAM 71 may have a size of 2*k bits organized as 2k rows and a single column, with address locations from 0 to 2*k−1. A k-bit challenge may be stored in a k-bit register 72 which may be coupled to the SRAM 71. An output of the SRAM 71 may be coupled to a q-bit down counter 73 and a p-bit LFSR 74. The output of the SRAM 71 may also be fed back to the register 72. An output of the down counter 73 may be coupled to the LFSR 74. A k-bit address decoder 75 may be coupled between a $\log_2$k-bit counter 76 and the register 72. An output of the LFSR 74 may be coupled to a compressor 77 which may provide the final response to the challenge. In operation, the strong SRAM PUF apparatus 70 may provide a variable latency output from the LFSR 74.

In some embodiments, the memory size of the SRAM 71 may be 2*k×1 bits, where k=64. For example, an SRAM array of 128×1 may provide the source of entropy for the PUF apparatus 70 and may provide a challenge-response space of $2^{64}$. Some embodiments may utilize 2*k memory addresses for a k bit challenge (e.g., as explained below). For illustrative purposes, the following example divides the output of the SRAM 71 into two segments with p=48 and q=16. The PUF operation may be executed in two passes. In the first pass, the content (e.g., 64 addresses out of 128) of the SRAM 71 may be read. The content may be fed back to determine an updated SRAM address for the second pass. In the second pass, the content of the SRAM 71 may be read and loaded into the LFSR 74 and the down counter 73.

In the first pass, the k-bit (e.g., 64 bit) challenge may be stored in the input register 72. If a particular challenge is true (or false), a corresponding SRAM odd row (or even row) may be selected, for instance if $bit_0$=0, WL0 is selected, else WL1 is selected and if $bit_1$=0, WL2 is selected, else WL3 is selected and so on. Accordingly, for the k-bit challenge, a 2*k memory address space may be needed. The output of the counter 76 may be decoded by the address decoder 75 to ensure that at any given moment, only one row of the SRAM 71 is enabled. The output of the SRAM addresses may be read sequentially as the counter sequence moves forward, and the SRAM memory contents may be fed back and XORed with the corresponding challenge bit stored in the front-end register.

For example, a challenge C0=0 may select the wordline WL0, when the counter 76 starts counting. Assuming the content of the selected SRAM location is logic 1, when the content is fed back and XORed with C0 the XOR operation results in 1 which may be stored in the same location of the register 72. Consequently, now updated C0=1 which enables the wordline WL1 during the second pass of response generation. This loop may be executed 64 times, and at the end of the loop, the register 72 stores an updated challenge (e.g., or wordline) value. Advantageously, by executing the first pass, some embodiments may make it more difficult for an attacker to accurately model the set of addresses used to generate the response, reducing the effectiveness of ML algorithms to model the PUF.

In the second pass, the counter 76 may start counting again. The read output of the first p bits may be loaded in the p-bit wide LFSR 74. If the LFSR 74 is of maximal length, the cycle time of the LFSR 74 may be (2p−1). The rest of the selected bits of the SRAM 71 (e.g., k−p=q) may be loaded into the q-bit down counter 73 which may be capable of counting up to 2*q times. Accordingly, the count of the down counter 73 may be random because the initial value of the down counter 73 depends on the content of the SRAM 71, and advantageously may provide resistance against ML attacks. In this duration, the down counter 73 may enable the LFSR 74 to rotate its content in a predetermined order which may further obfuscate the response. The output(s) of the LFSR 74 may be sent to the output compressor 77 which may produce a single bit or multi-bit output for the final response. Advantageously, the feed-forward addressing and variable latency output of the strong SRAM PUF apparatus 70 may isolate the SRAM 71 from an attacker. For example, the apparatus 70 may significantly increase the number of challenge/response pairs that a ML attacker may need to create an attack model.

Figure 8:
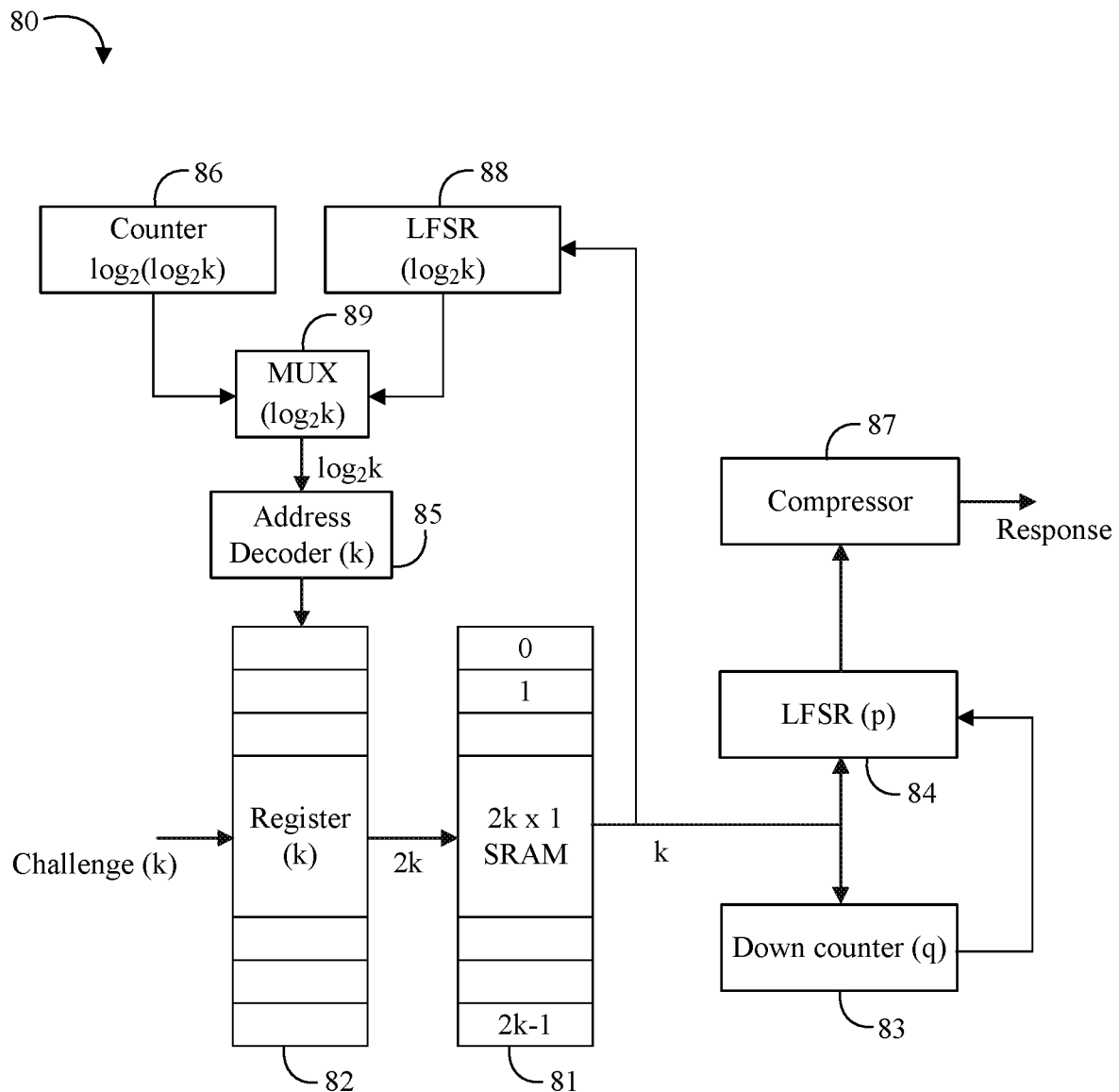
FIG. 8 is a block diagram of another example of a strong SRAM PUF apparatus according to an embodiment.

Turning now to FIG. 8, an embodiment of a strong SRAM PUF 80 may include a SRAM 81 as a source of entropy. For example, the SRAM 81 may have a size of 2*k×1 bit, with address locations from 0 to 2*k−1. A k-bit challenge may be stored in a k-bit register 82 which may be coupled to the SRAM 81. An output of the SRAM 81 may be coupled to a q-bit down counter 83 and a first LFSR 84 (e.g., a p-bit LFSR). An output of the down counter 83 may be coupled to the first LFSR 84. The output of the SRAM 81 may also be fed back to a second LFSR 88 (e.g., a $\log_2$k-bit LFSR). An output of the second LFSR 88 may be coupled to a $\log_2$k multiplexer (MUX) 89. An output of a $\log_2$k counter 86 may also be coupled to the MUX 89. A $\log_2$k-bit address decoder 85 may be coupled between the MUX 89 and the register 82. An output of the first LFSR 84 may be coupled to a compressor 87 which may provide the final response to the challenge. In operation, the strong SRAM PUF apparatus 80 may provide a variable latency output from the first LFSR 84.

In some embodiments, the MUX 89 may select the up (or down) counter 86 in the first pass. For example, the bits of the counter 86 may be decoded by the address decoder 85 and an appropriate wordline may be selected. In this embodiment, the counter 86 may need to count only six ($\log_2$64=6) times. The content of six (6) SRAM locations may be stored in the second LFSR 88 which may provide a seed for address generation in the second pass.

In the second pass, the MUX 89 may select the second LFSR 88 for a pseudo-random address sequence generation. Because the output of the PUF employs another LFSR (the first LFSR 84), the order of the output bits may also define the seed of the first LFSR 84 and also the final response. After the first LFSR 84 is seeded and the down counter 83 is set, the second pass may be executed as described above in connection with FIG. 7. Advantageously, the feed-forward addressing and variable latency output of the strong SRAM PUF apparatus 80 may isolate the SRAM 81 from an attacker. For example, the apparatus 80 may significantly increase the number of challenge/response pairs that a ML attacker may need to create an attack model. The second LFSR 88 may need to be a minimum size of log 2(k) to access all the 64-bits of the challenge. However, this will use only 6 feed forward bits, which may not be enough to completely de-correlate the challenge from the actual challenge used. In some embodiments, a wider second LFSR 88 may be used with 6 or more feed-forward bits used to seed it, thereby increasing the number of SRAM bits participating in the feedforward and hence providing better decorrelation of the challenge.

As may be apparent to those skilled in the art given the benefit of the present application, the variable latency output LFSR may be independent of the PUF implementation. For example, the variable latency output LFSR may be implemented with timing-based PUFs such as an arbiter PUF, a ring oscillator PUF, etc. In some embodiments (e.g., including memory-based PUFs) timing attacks due to the variable latency may be hidden from an attacker by providing the final response at a fixed pre-determined latency. Similarly, in some embodiments the output compressor block may be implemented as a sequence dependent function, etc. The strong SRAM PUFs 70, 80 are only illustrative example implementations of suitable feed-forward and variable latency logic. Given the benefit of the present application, numerous other implementations of suitable feed-forward and variable latency logic/circuits/modules will occur to those skilled in the art.

Figure 9:
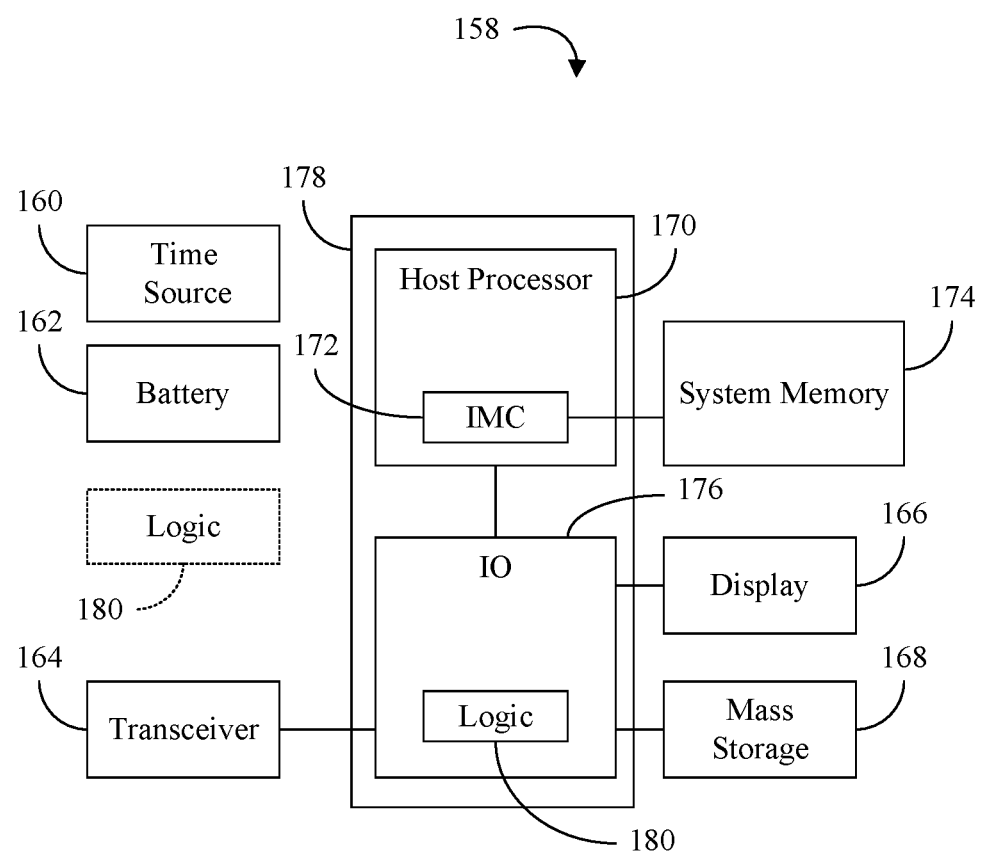
FIG. 9 is a block diagram of an example of a computing device according to an embodiment.

FIG. 9 shows a computing device 158 that may be readily substituted for one or more of the electronic processing system 10 (FIG. 1), the semiconductor apparatuses 20, 30 (FIGS. 2, 3), or may include the strong PUF apparatuses 60, 65, 67 (FIGS. 6A to 6C), the strong SRAM PUF apparatus 70 (FIG. 7), and/or the strong SRAM PUF apparatus 80 (FIG. 8), already discussed. In the illustrated example, the device 158 includes a time source 160 (e.g., crystal oscillator, clock), a battery 162 to supply power to the device 158, a transceiver 164 (e.g., wireless or wired), a display 166 and mass storage 168 (e.g., hard disk drive/HDD, solid state disk/SSD, optical disk, flash memory). The device 158 may also include a host processor 170 (e.g., CPU) having an integrated memory controller (IMC) 172, which may communicate with system memory 174. The system memory 174 may include, for example, dynamic random access memory (DRAM) configured as one or more memory modules such as, for example, dual inline memory modules (DIMMs), small outline DIMMs (SODIMMs), etc. The illustrated device 158 also includes an input output (IO) module 176 implemented together with the processor 170 on a semiconductor die 178 as a system on chip (SoC), wherein the IO module 176 functions as a host device and may communicate with, for example, the display 166, the transceiver 164, the mass storage 168, and so forth. The mass storage 168 may include non-volatile memory (NVM) that stores one or more keys (e.g., MAC generation keys, encryption keys).

The IO module 176 may include logic 180 that causes the semiconductor die 178 to implement a strong PUF such as described in connection with, for example, the electronic processing system 10 (FIG. 1), the semiconductor apparatuses 20, 30 (FIGS. 2, 3), or may include the strong PUF apparatuses 60, 65, 67 (FIGS. 6A to 6C), the strong SRAM PUF apparatus 70 (FIG. 7), and/or the strong SRAM PUF apparatus 80 (FIG. 8). Thus, the logic 180 may generate a first output from a PUF based on a challenge, modify a challenge based on the first output, and generate a response based on the modified challenge. Additionally, or alternatively, the logic 180 may generate a first output from a SRAM PUF based on a challenge, change a read sequence of the SRAM PUF based on the first output of the SRAM PUF, and generate a response based on the changed read sequence In some embodiments, the logic 180 may additionally or alternatively generate an output from a PUF based on a challenge, vary a latency of a LFSR based on the output from the PUF, and generate a response based on an output of the LFSR. For example, the logic 180 may modify a number of cycles for the LFSR based on the output from the PUF. In some embodiments, the logic 180 may also compress the response. In one example, the time source 160 is autonomous/independent from the controller in order to enhance security (e.g., to prevent the controller from tampering with cadence, frequency, latency and/or timestamp data). The logic 180 may also be implemented elsewhere in the device 158.

Figure 10:
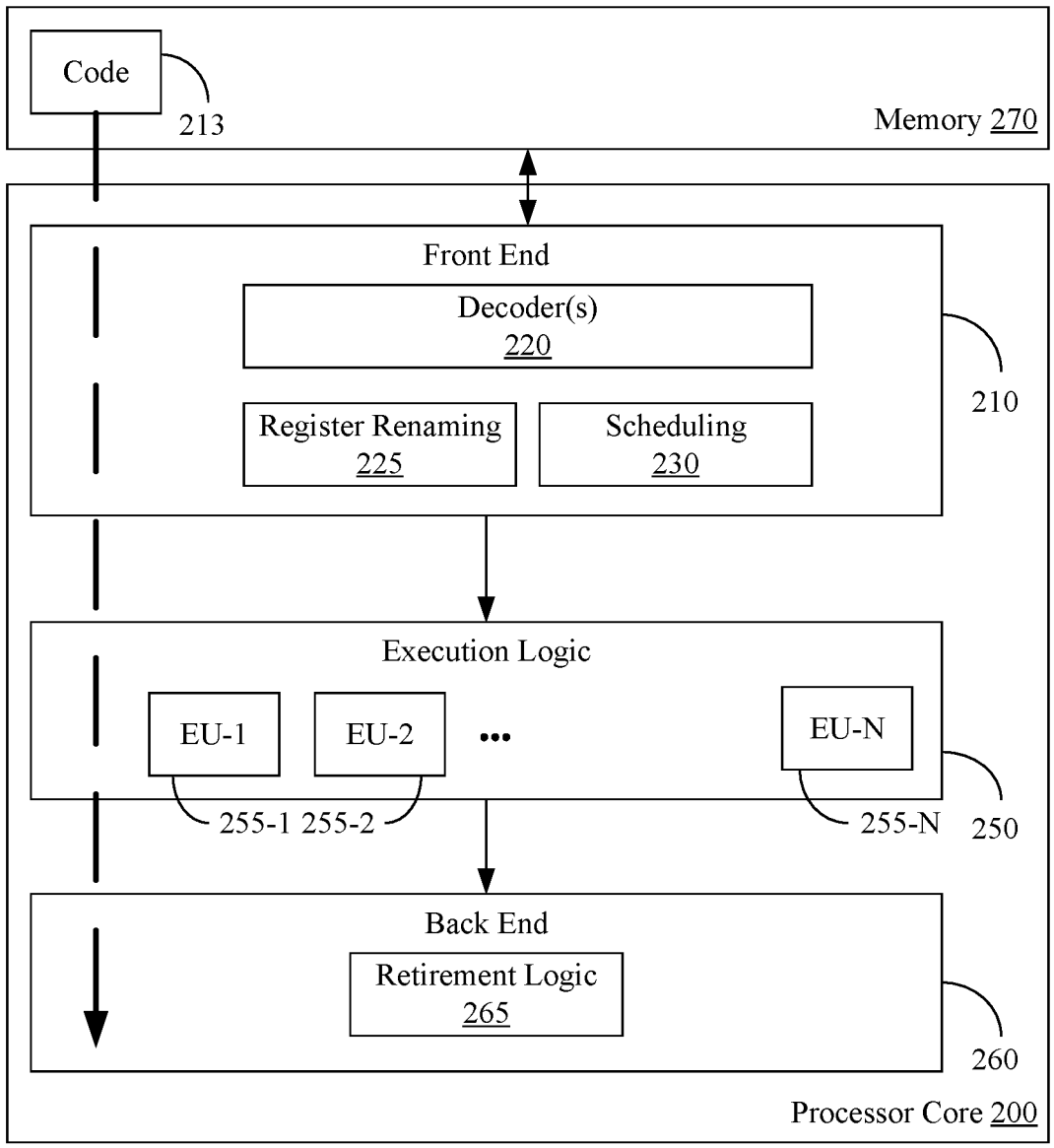
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 40 (FIGS. 4A to 4C), the method 50 (FIGS. 5A to 5C) and/or the respective first and second passes (FIGS. 7 and 8), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
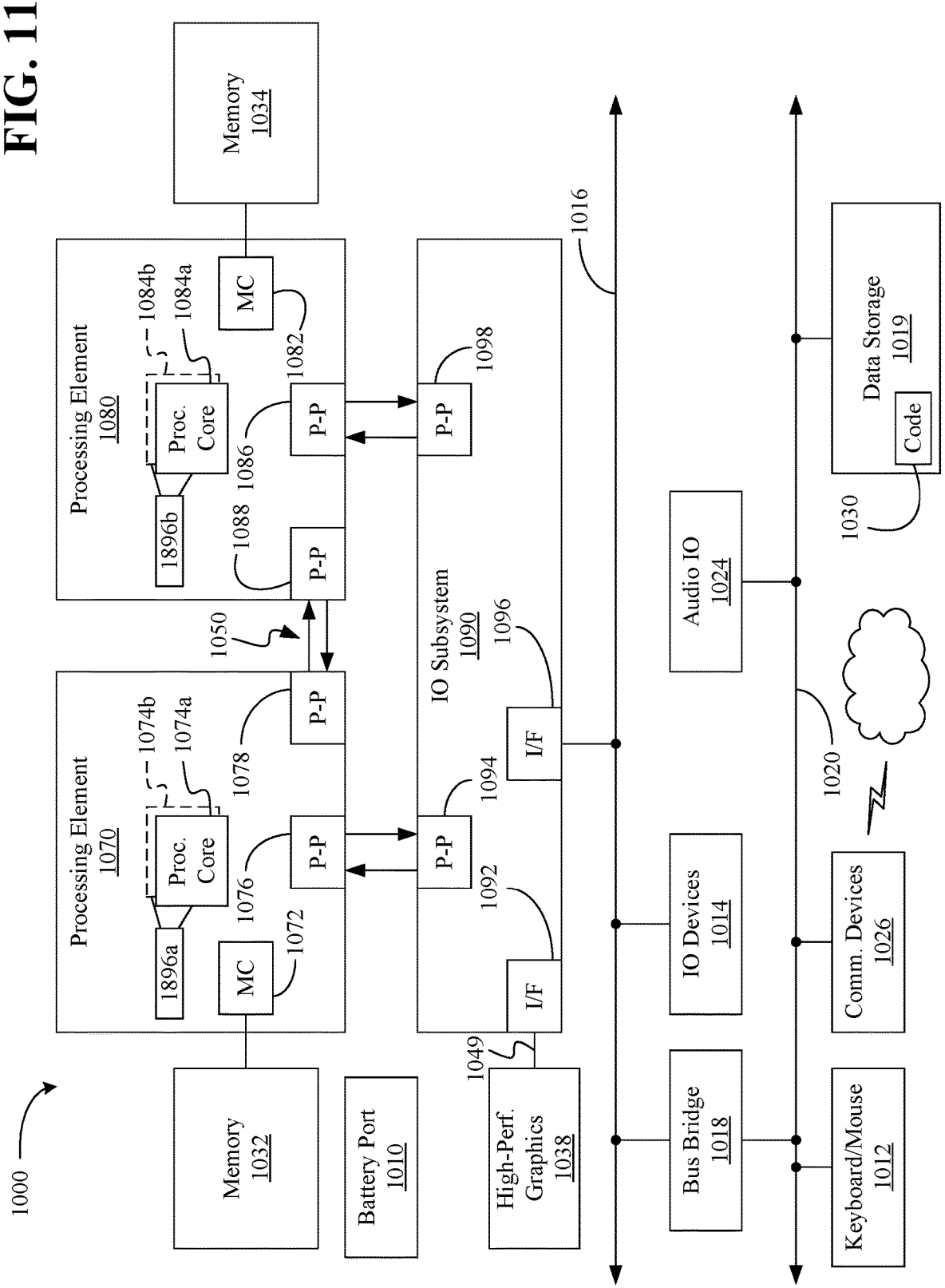
FIG. 11 is a block diagram of an example of a computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 40 (FIGS. 4A to 4C), the method 50 (FIGS. 5A to 5C) and/or the respective first and second passes (FIGS. 7 and 8), already discussed, and may be similar to the code 213 (FIG. 10), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

ADDITIONAL NOTES AND EXAMPLES

Example 1 may include an electronic processing system, comprising a processor, memory communicatively coupled to the processor, a PUF, and logic communicatively coupled to the processor and the PUF to generate a first output from the PUF based on a challenge, modify the challenge based on the first output, and generate a response based on the modified challenge. Example 2 may include the system of Example 1, wherein the PUF comprises a SRAM, and wherein the logic is further to change a read sequence of the SRAM based on an output of the PUF. Example 3 may include the system of Example 1, further comprising a variable latency LFSR communicatively coupled to the logic. Example 4 may include the system of Example 3, wherein the logic is further to modify a number of cycles for the variable latency LFSR based on an output from the PUF. Example 5 may include the system of Example 4, further comprising a compressor communicatively coupled to the variable latency LFSR to compress the response. Example 6 may include the system of any of Examples 1 to 5, wherein the PUF comprises one or more of a memory-based unclonable function and a timing-based unclonable function.

Example 7 may include a semiconductor package apparatus, comprising one or more substrates, and a PUF coupled to the one or more substrates, and logic coupled to the PUF and to the one or more substrates, wherein the logic is at least partly implemented in one or more of configurable logic and fixed-functionality hardware logic, the logic coupled to the one or more substrates to generate a first output from the PUF based on a challenge, modify the challenge based on the first output, and generate a response based on the modified challenge. Example 8 may include the apparatus of Example 7, wherein the PUF comprises a SRAM, and wherein the logic is further to change a read sequence of the SRAM based on an output of the PUF. Example 9 may include the apparatus of Example 7, further comprising a variable latency LFSR communicatively coupled to the logic. Example 10 may include the apparatus of Example 9, wherein the logic is further to modify a number of cycles for the variable latency LFSR based on an output from the PUF. Example 11 may include the apparatus of Example 10, further comprising a compressor communicatively coupled to the variable latency LFSR to compress the response. Example 12 may include the apparatus of any of Examples 7 to 11, wherein the PUF comprises one or more of a memory-based unclonable function and a timing-based unclonable function. Example 13 may include the apparatus of any of Examples 7 to 11, wherein the logic coupled to the one or more substrates includes transistor channel regions that are positioned within the one or more substrates.

Example 14 may include a method of generating a response to a challenge, comprising generating a first output from a PUF based on a challenge, modifying the challenge based on the first output, and generating a response based on the modified challenge. Example 15 may include the method of Example 14, wherein the PUF comprises a SRAM, the method further comprising changing a read sequence of the SRAM based on an output of the PUF. Example 16 may include the method of Example 14, further comprising varying a latency of a LFSR based on an output from the PUF. Example 17 may include the method of Example 16, further comprising modifying a number of cycles for the LFSR based on an output from the PUF. Example 18 may include the method of Example 17, further comprising compressing an output of the LFSR to provide the response. Example 19 may include the method of any of Examples 14 to 18, wherein the PUF comprises one or more of a memory-based unclonable function and a timing-based unclonable function.

Example 20 may include a semiconductor package apparatus, comprising one or more substrates, and a PUF coupled to the one or more substrates, a LFSR communicatively coupled to the one or more substrates, and logic coupled to the PUF, the LFSR, and to the one or more substrates, wherein the logic is at least partly implemented in one or more of configurable logic and fixed-functionality hardware logic, the logic coupled to the one or more substrates to generate an output from the PUF based on a challenge, vary a latency of the LFSR based on the output from the PUF, and generate a response based on an output of the LFSR. Example 21 may include the apparatus of Example 20, wherein the logic is further to modify a number of cycles for the LFSR based on the output from the PUF. Example 22 may include the apparatus of Example 20, further comprising a compressor communicatively coupled to the LFSR to compress the response. Example 23 may include the apparatus of Example 20, wherein the logic is further to modify the challenge based on the output of the PUF. Example 24 may include the apparatus of any of Examples 20 to 23, wherein the PUF comprises one or more of a memory-based unclonable function and a timing-based unclonable function. Example 25 may include the apparatus of any of Examples 20 to 23, wherein the logic coupled to the one or more substrates includes transistor channel regions that are positioned within the one or more substrates.

Example 26 may include a method of generating a response to a challenge, comprising generating an output from a PUF based on a challenge, varying a latency of a LFSR based on the output from the PUF, and generating a response based on an output of the LFSR. Example 27 may include the method of Example 26, further comprising modifying a number of cycles for the LFSR based on the output from the PUF. Example 28 may include the method of Example 26, further comprising compressing the response. Example 29 may include the method of Example 26, further comprising modifying the challenge based on the output of the PUF. Example 30 may include the method of any of Examples 26 to 29, wherein the PUF comprises one or more of a memory-based unclonable function and a timing-based unclonable function.

Example 31 may include at least one computer readable medium, comprising a set of instructions, which when executed by a computing device, cause the computing device to generate an output from a PUF based on a challenge, vary a latency of a LFSR based on the output from the PUF, and generate a response based on an output of the LFSR. Example 32 may include the at least one computer readable medium of Example 31, comprising a further set of instructions, which when executed by the computing device, cause the computing device to modify a number of cycles for the LFSR based on the output from the PUF. Example 33 may include the at least one computer readable medium of Example 31, comprising a further set of instructions, which when executed by the computing device, cause the computing device to compress the response. Example 34 may include the at least one computer readable medium of Example 31, comprising a further set of instructions, which when executed by the computing device, cause the computing device to modify the challenge based on the output of the PUF. Example 35 may include the at least one computer readable medium of any of Examples 31 to 34, wherein the PUF comprises one or more of a memory-based unclonable function and a timing-based unclonable function.

Example 36 may include a strong PUF apparatus, comprising means for generating an output from a PUF based on a challenge, means for varying a latency of a LFSR based on the output from the PUF, and means for generating a response based on an output of the LFSR. Example 37 may include the apparatus of Example 36, further comprising means for modifying a number of cycles for the LFSR based on the output from the PUF. Example 38 may include the apparatus of Example 36, further comprising means for compressing the response. Example 39 may include the apparatus of Example 36, further comprising means for modifying the challenge based on the output of the PUF. Example 40 may include the apparatus of any of Examples 36 to 39, wherein PUF comprises one or more of a memory-based unclonable function and a timing-based unclonable function.

Example 41 may include at least one computer readable medium, comprising a set of instructions, which when executed by a computing device, cause the computing device to generate a first output from a PUF based on a challenge, modify the challenge based on the first output, and generate a response based on the modified challenge. Example 42 may include the at least one computer readable medium of Example 41, wherein the PUF comprises a SRAM, comprising a further set of instructions, which when executed by the computing device, cause the computing device to change a read sequence of the SRAM based on an output of the PUF. Example 43 may include the at least one computer readable medium of Example 41, comprising a further set of instructions, which when executed by the computing device, cause the computing device to vary a latency of a LFSR based on an output from the PUF. Example 44 may include the at least one computer readable medium of Example 43, comprising a further set of instructions, which when executed by the computing device, cause the computing device to modify a number of cycles for the LFSR based on an output from the PUF. Example 45 may include the at least one computer readable medium of Example 44, comprising a further set of instructions, which when executed by the computing device, cause the computing device to compress an output of the LFSR to provide the response. Example 46 may include the at least one computer readable medium of any of Examples 41 to 45, wherein PUF comprises one or more of a memory-based unclonable function and a timing-based unclonable function.

Example 47 may include a strong PUF apparatus, comprising means for generating a first output from a PUF based on a challenge, means for modifying the challenge based on the first output, and means for generating a response based on the modified challenge. Example 48 may include the apparatus of Example 47, wherein the PUF comprises a SRAM, the apparatus further comprising means for changing a read sequence of the SRAM based on an output of the PUF. Example 49 may include the apparatus of Example 47, further comprising means for varying a latency of a LFSR based on an output from the PUF. Example 50 may include the apparatus of Example 49, further comprising means for modifying a number of cycles for the LFSR based on an output from the PUF. Example 51 may include the apparatus of Example 50, further comprising means for compressing an output of the LFSR to provide the response. Example 52 may include the apparatus of any of Examples 47 to 51, wherein the PUF comprises one or more of a memory-based unclonable function and a timing-based unclonable function.

Example 53 may include an electronic processing system, comprising a processor, memory communicatively coupled to the processor, a SRAM PUF, and logic communicatively coupled to the processor and the SRAM PUF to generate a first output from the SRAM PUF based on a challenge, change a read sequence of the SRAM PUF based on the first output of the SRAM PUF, and generate a response based on the changed read sequence. Example 54 may include the system of Example 53, further comprising a variable latency LFSR communicatively coupled to the logic. Example 55 may include the system of Example 54, wherein the logic is further to modify a number of cycles for the variable latency LFSR based on a second output from the SRAM PUF. Example 56 may include the system of Example 55, further comprising a compressor communicatively coupled to the variable latency LFSR to compress the response.

Example 57 may include a semiconductor package apparatus, comprising one or more substrates, and a SRAM PUF coupled to the one or more substrates, and logic coupled to the SRAM PUF and to the one or more substrates, wherein the logic is at least partly implemented in one or more of configurable logic and fixed-functionality hardware logic, the logic coupled to the one or more substrates to generate a first output from the SRAM PUF based on a challenge, change a read sequence of the SRAM PUF based on the first output of the SRAM PUF, and generate a response based on the changed read sequence. Example 58 may include the apparatus of Example 57, further comprising a variable latency LFSR communicatively coupled to the logic. Example 59 may include the apparatus of Example 58, wherein the logic is further to modify a number of cycles for the variable latency LFSR based on a second output from the SRAM PUF. Example 60 may include the apparatus of Example 59, further comprising a compressor communicatively coupled to the variable latency LFSR to compress the response. Example 61 may include the apparatus of any of Examples 57 to 60, wherein the logic coupled to the one or more substrates includes transistor channel regions that are positioned within the one or more substrates.

Example 62 may include a method of generating a response to a challenge, comprising generating a first output from a SRAM PUF based on a challenge, changing a read sequence of the SRAM PUF based on the first output of the SRAM PUF, and generating a response based on the changed read sequence. Example 63 may include the method of Example 62, further comprising varying a latency of a LFSR based on a second output from the SRAM PUF. Example 64 may include the method of Example 63, further comprising modifying a number of cycles for the LFSR based on the second output from the SRAM PUF. Example 65 may include the method of Example 64, further comprising compressing an output of the LFSR to provide the response.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   a processor;
   memory communicatively coupled to the processor;
   a physically unclonable function, wherein the physically unclonable function is to include one or more of a memory-based unclonable function or a timing-based unclonable function;
   logic communicatively coupled to the processor and the physically unclonable function to:
      generate a first output from the physically unclonable function based on a challenge,
      modify the challenge based on the first output, wherein modification of the challenge is to decorrelate a challenge sent to the system from a challenge provided to the physically unclonable function, and
      generate a response based on the modified challenge,
   wherein the physically unclonable function comprises a static random access memory, and wherein the logic is to change a read sequence of the static random access memory based on an output of the physically unclonable function;
   a variable latency linear feedback shift register communicatively coupled to the logic, wherein the output is to modify a number of cycles for the variable latency linear feedback shift register based on an output from the physically unclonable function; and
   a compressor communicatively coupled to the variable latency linear feedback shift register to compress the response,
   wherein the physically unclonable function and logic are to provide a security primitive to authenticate the system, and to decorrelate the challenge and the response to prevent attacks on the physically unclonable function based on cadence, frequency, latency and timestamp data.

2. A semiconductor package apparatus, comprising:
   one or more substrates;
   a physically unclonable function coupled to the one or more substrates, wherein the physically unclonable function is to include one or more of a memory-based unclonable function or a timing-based unclonable function;
   logic coupled to the physically unclonable function and to the one or more substrates, wherein the logic is at least partly implemented in one or more of configurable logic and fixed-functionality hardware logic, the logic coupled to the one or more substrates to:
      generate a first output from the physically unclonable function based on a challenge,
      modify the challenge based on the first output, wherein modification of the challenge is to decorrelate a challenge sent to the system from a challenge provided to the physically unclonable function, and
      generate a response based on the modified challenge,
   wherein the physically unclonable function comprises a static random access memory, and wherein the logic is to change a read sequence of the static random access memory based on an output of the physically unclonable function;
   a variable latency linear feedback shift register communicatively coupled to the logic, wherein the output is to modify a number of cycles for the variable latency linear feedback shift register based on an output from the physically unclonable function; and
   a compressor communicatively coupled to the variable latency linear feedback shift register to compress the response,
   wherein the physically unclonable function and logic are to provide a security primitive to authenticate the apparatus, and to decorrelate the challenge and the response to prevent attacks on the physically unclonable function based on cadence, frequency, latency and timestamp data.

3. The apparatus of claim 2, wherein the logic coupled to the one or more substrates includes transistor channel regions that are positioned within the one or more substrates.

4. A method of generating a response to a challenge, comprising:
   generating, via logic at least partly implemented in one or more of configurable logic and fixed-functionality hardware logic, a first output from a physically unclonable function based on a challenge, wherein the physically unclonable function is to include one or more of a memory-based unclonable function or a timing-based unclonable function;
   modifying, via the logic, the challenge based on the first output, wherein modification of the challenge is to decorrelate a challenge sent to the system from a challenge provided to the physically unclonable function;
   generating, via the logic, a response based on the modified challenge,
   wherein the physically unclonable function comprises a static random access memory, and wherein the logic is to change a read sequence of the static random access memory based on an output of the physically unclonable function;

a variable latency linear feedback shift register communicatively coupled to the logic, wherein the output is to modify a number of cycles for the variable latency linear feedback shift register based on an output from the physically unclonable function; and a compressor communicatively coupled to the variable latency linear feedback shift register to compress the response, wherein the physically unclonable function and logic are to provide a security primitive for authentication, and to decorrelate the challenge and the response to prevent attacks on the physically unclonable function based on cadence, frequency, latency and timestamp data.

5. A semiconductor package apparatus, comprising:

one or more substrates;

a physically unclonable function coupled to the one or more substrates, wherein the physically unclonable function is to include one or more of a memory-based unclonable function or a timing-based unclonable function;

a linear feedback shift register communicatively coupled to the one or more substrates;

logic coupled to the physically unclonable function, the linear feedback shift register, and to the one or more substrates, wherein the logic is at least partly implemented in one or more of configurable logic and fixed-functionality hardware logic, the logic coupled to the one or more substrates to:

generate an output from the physically unclonable function based on a challenge, modify the challenge based on the output of the physically unclonable function, wherein modification of the challenge is to decorrelate a challenge sent to the system from a challenge provided to the physically unclonable function, vary a latency of the linear feedback shift register based on the output from the physically unclonable function, generate a response based on an output of the linear feedback shift register, and modify a number of cycles for the linear feedback shift register based on the output from the physically unclonable function, and a compressor communicatively coupled to the linear feedback shift register to compress the response, wherein the physically unclonable function and logic are to provide a security primitive to authenticate the apparatus, and to decorrelate the challenge and the response to prevent attacks on the physically unclonable function based on cadence, frequency, latency and timestamp data.

6. The apparatus of claim 5, wherein the logic coupled to the one or more substrates includes transistor channel regions that are positioned within the one or more substrates.

* * * * *